US012570527B2

(12) United States Patent
Meissner et al.

(10) Patent No.: US 12,570,527 B2
(45) Date of Patent: Mar. 10, 2026

(54) METHOD AND APPARATUS FOR STARTING UP AN APPARATUS FOR STEAM REFORMING

(71) Applicants: thyssenkrupp Industrial Solutions AG, Essen (DE); thyssenkrupp AG, Essen (DE)

(72) Inventors: Christoph Meissner, Luenen (DE); Michael Langanki, Ottersweier (DE); Bernd Mielke, Witten (DE); Klaus Noelker, Dortmund (DE); Lukas Kubasch, Dortmund (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 846 days.

(21) Appl. No.: 17/881,185

(22) Filed: Aug. 4, 2022

(65) Prior Publication Data

US 2023/0044089 A1    Feb. 9, 2023

(30) Foreign Application Priority Data

Aug. 5, 2021    (BE) ................................... 2021/5628
Aug. 5, 2021    (DE) ..................... 10 2021 208 532.6

(51) Int. Cl.
*C01B 3/34*        (2006.01)
*B01D 3/38*        (2006.01)
        (Continued)

(52) U.S. Cl.
CPC ................ *C01B 3/346* (2013.01); *B01D 3/38* (2013.01); *B01D 53/265* (2013.01); *C01B 3/506* (2013.01);
        (Continued)

(58) Field of Classification Search
CPC . C01B 3/346; C01B 3/506; C01B 2203/0233; C01B 2203/0495;
        (Continued)

(56) References Cited

U.S. PATENT DOCUMENTS 9,216,903 B2    12/2015 Mckenna et al.
9,266,056 B2    2/2016  Hoehn et al.

FOREIGN PATENT DOCUMENTS

CN          106430789 A      2/2017
DE    10 2007 027 397 A1    11/2008
        (Continued)

OTHER PUBLICATIONS

English machine translation of DE 102007027397 A1 (Year: 2008).*
English machine translation of DE 102018210921 A1 (Year: 2019).*
English machine translation of CN 106430789 A (Year: 2017).*

Primary Examiner — Anthony J Zimmer
Assistant Examiner — Abdul-Rahman Yusuf Waleed Smari
(74) Attorney, Agent, or Firm — thyssenkrupp North America, LLC

(57)        ABSTRACT

An apparatus for steam reforming includes a reactor, a condensate separator, a condensate stripper, and a steam boiler. The reactor produces hydrogen and is connected to the condensate separator such that a gas mixture is conducted from the reactor into the condensate separator. The condensate separator and the condensate stripper are connected so that condensate separated out in the condensate separator is conducted into the condensate stripper. The condensate separator and the steam boiler are connected such that cleaned condensate can be conducted into the steam boiler. The steam boiler is connected to the reactor and to the condensate stripper in a steam-conducting manner. The boiler water feed line of the steam boiler is connectable to the condensate stripper in a liquid-conducting manner. A
        (Continued)

supply from the boiler water feed line is at a same location of the condensate stripper as a supply of the condensate from the condensate separator.

10 Claims, 2 Drawing Sheets

(51) Int. Cl.
  B01D 53/26        (2006.01)
  C01B 3/50         (2006.01)
  C01B 3/506        (2026.01)
(52) U.S. Cl.
  CPC ................. *C01B 2203/0233* (2013.01); *C01B 2203/0495* (2013.01); *C01B 2203/1604* (2013.01); *C01B 2203/1609* (2013.01)
(58) Field of Classification Search
  CPC .... C01B 2203/1604; C01B 2203/1609; C01B 2203/0205; C01B 2203/0283; C01B 2203/068; C01B 3/34; B01D 3/38; B01D 53/265
  See application file for complete search history.

(56)                  References Cited

FOREIGN PATENT DOCUMENTS

DE      10 2018 210 921  A1      8/2019
EP              2 516 327  A1     10/2012

* cited by examiner

Fig. 1 - prior art

METHOD AND APPARATUS FOR STARTING UP AN APPARATUS FOR STEAM REFORMING

CROSS REFERENCE TO RELATED APPLICATIONS

This application is a U.S. Non-Provisional Application that claims priority to German Patent Application No. DE 10 2021 208 532.6, filed Aug. 5, 2021, and of Belgian Patent Application No. BE 2021/5628, filed Aug. 5, 2021, the entire contents of both of which are incorporated herein by reference.

FIELD

The present disclosure generally relates to methods and apparatuses for steam reforming, including methods and apparatuses for steam reforming that avoid or at least minimize emissions.

BACKGROUND

Steam reforming involves reacting hydrocarbons—especially methane—with steam and then with a deficiency of oxygen to give carbon monoxide and hydrogen. In the subsequent water-gas shift reaction, the carbon monoxide produced is reacted with steam to give hydrogen and carbon dioxide. After this process, the gas mixture is typically cooled down wherein a condensate is formed. Apart from water, this condensate also contains organic by-products that have formed, for example methanol, formic acid or acetic acid. In order to remove these by-products from the condensate, the condensate is conducted through a condensate stripper. The condensate stripper is typically a column in which the organic constituents are desorbed from the condensate by means of steam under pressure. The stripped condensate can then, for example, be demineralized and then fed back to a steam-generation boiler.

While the process in the condensate stripper is reliable while the process is running, starting up is a critical factor. In order to avoid thermal problems within the column, the condensate is first passed through the column and then the column is cautiously heated with steam until the steady state is established with regard to a homogeneous temperature distribution. Since the organic components are not or at least not completely removed from the condensate in this start-up phase, this contaminated condensate is, for example, collected in a storage tank and fed back to the running condensate stripper later on in the steady state. This means that an additional tank and corresponding conveying equipment has to be provided for the purpose, which increases the capital costs and size of the plant. Alternatively, the condensate stored in the tank can be sent to separate disposal or an external treatment, which is associated with high running costs.

From DE 10 2007 027 397 A1, a method of cooling a process gas containing hydrogen and steam from a hydrogen recovery plant is known.

From U.S. Pat. No. 9,266,056 B2, a method of starting up a separating apparatus is known.

Thus a need exists for a method and an apparatus that can be started up in a simple manner without having an additional tank or further installations for untreated condensate.

DETAILED DESCRIPTION

Figure 1:
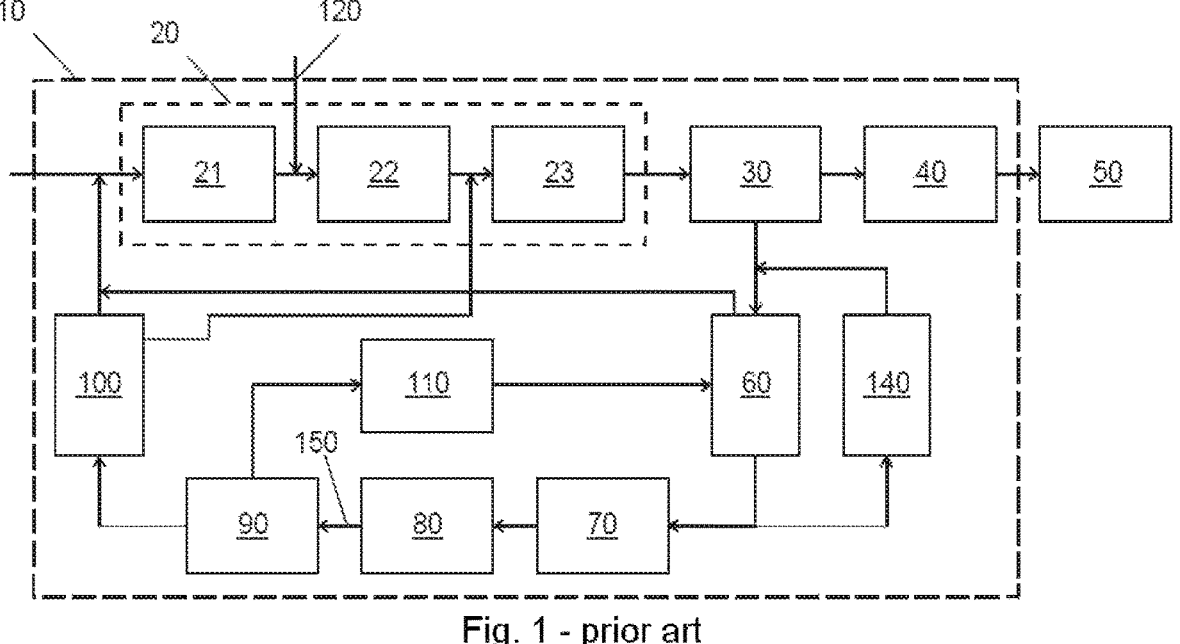
FIG. 1 is a schematic view of the prior art.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The apparatus of the present disclosure serves for steam reforming. This typically involves reacting hydrocarbons—especially methane—with steam and with a deficiency of oxygen, at first to give carbon monoxide and hydrogen, followed by reacting the carbon monoxide with further steam in the water-gas shift reaction to give carbon dioxide and hydrogen. Subsequently, the carbon dioxide is typically separated off. Therefore, the gas mixture is cooled down after steam reforming, which gives rise to water as condensate. This condensate typically includes impurities that especially consist of by-products from the aforementioned reactions and which may, for example, be methanol, formic acid or acetic acid.

The apparatus for steam reforming comprises a reactor, a condensate separator, a condensate stripper and a steam boiler. The reactor is designed to produce hydrogen; in other words, the actual steam reforming and the water-gas shift reaction take place here. In the context of the present disclosure, the reactor may also consist of two or more separate units in which, for example, different reaction steps proceed, for example a first reactor section for the reaction of methane with steam, a second reactor section for the reaction of methane with oxygen, and a third reactor section and fourth reactor section for the high-temperature and low-temperature water-gas shift reaction. For the present disclosure, it is irrelevant whether the reactor has a common housing or whether the reactor consists of a number of reactor sections connected in series. The condensate separator serves to separate condensed water from the product gas stream. The condensate separator may thus, for example, be a heat exchanger with a suitable volume for separation of gas phase and liquid phase, as well as for storage of condensate. It may also be an arrangement of a heat exchanger and a downstream separator. The condensate stripper serves to desorptively remove evaporable components from a liquid. For example, a condensate stripper may be designed as a tray column, as a column having structured packings, or as a column having random packings. The steam boiler serves to generate steam from liquid water. For the further processes, the steam may also be heated further in downstream steps.

The reactor is connected to the condensate separator in such a way that the gas mixture produced is conducted from the reactor into the condensate separator. The condensate separator and condensate stripper are connected to each other in such a way that the condensate separated out in the condensate separator is conducted into the condensate stripper.

The condensate separator and the steam boiler are connected to each other in such a way that cleaned condensate from the condensate stripper can be conducted into the steam boiler. In this case, the condensate is preferably conducted via an apparatus for demineralization from the condensate stripper into the steam boiler. Further preferably disposed between the apparatus for demineralization and the steam boiler is an apparatus for degassing, in which, for example and in particular, oxygen and carbon dioxide are removed from the water.

The steam boiler is connected to the reactor in a steam-conducting manner, and the steam boiler is likewise connected to the condensate stripper in a steam-conducting manner. It is possible here for one or more superheaters to be disposed between the steam boiler and the reactor. It is likewise possible for one or more superheaters to be disposed between the steam boiler and the condensate stripper. Superheaters may be designed, for example, in the form of heat exchangers.

According to the present disclosure, the boiler water feed line of the steam boiler is connectable to the condensate stripper in a liquid-conducting manner. The connection is thus designed such that via this connection, liquid water can be taken from the boiler water feed line of the steam boiler and sent to the condensate stripper. What is essential is that the supply of liquid water from the boiler water feed line of the steam boiler is at the same place of the condensate stripper as the supply of the condensate from the condensate separator. This makes it possible, rather than condensate, to feed dean water from the boiler water feed line of the steam boiler to the condensate stripper. This makes it possible to start up the condensate stripper before condensate is being provided from the condensate separator. As a result, the condensate stripper is already at operating temperature when the first (contaminated) condensate is supplied, such that the organic impurities can already be removed reliably in the condensate stripper from the outset.

What is meant by "connectable" in the context of the present disclosure is any connection that can be established temporarily. Particular preference is given to fixed piping that can be opened and closed by means of a valve. Of course, it is also possible to establish a temporary connection, for example with a hose. What is essential is that specifically only water from the boiler water feed line of the steam boiler is conducted into the condensate stripper.

In a further embodiment of the present disclosure, the condensate-conducting connection between the condensate separator and the condensate stripper and the liquid-conducting connection between the boiler water feed line of the steam boiler and the condensate stripper lead into the condensate stripper via a common connection. For example, the two connections are connected via a valve to the condensate stripper in such a way that either condensate from the condensate separator or water from the boiler water feed line of the steam boiler can be conducted into the condensate stripper.

In a further embodiment of the present disclosure, the boiler water feed line of the steam boiler is connectable to the condensate stripper in a liquid-conducting manner via a valve.

In particular, the process gas that leaves the condensate separator is sent to a $CO_2$ separator and subsequently converted to ammonia in a Haber-Bosch process.

In a further aspect, the present disclosure relates to a method of starting up an apparatus for steam reforming, preferably an apparatus according to the present disclosure. The method of the present disclosure differs from conventional methods, familiar to the person skilled in the art, of starting up an apparatus for steam reforming specifically in that a condensate stripper is supplied firstly with water from a boiler water feed line of a steam boiler. This water has a similar temperature as the condensate (difference of ±40 K, preferably ±25 K). However, since this water is clean, this does not yet introduce contaminations into the condensate stripper, and so it is immaterial that at the start, the condensate stripper is unable to remove the contaminants from the water. Once water has been supplied from the boiler water feed line of the steam boiler to the condensate stripper, steam from the steam boiler is supplied to the condensate stripper. This can be performed in such a way that the condensate stripper is brought gradually to temperature, thereby avoiding significant thermal stress on the condensate stripper. Within this period, the water is virtually circulated via a demineralization unit. Since this water does not include any contaminants, however, this does not give rise to any problem, no liquid needs to be intermediately stored in a tank, or to be disposed. This also makes it possible to start-up the condensate stripper before the condensate is being produced, such that the condensate stripper is already in the thermally steady state when the first condensate is obtained in a condensate separator. Only after establishment of thermal equilibrium, the supply of water from the boiler water feed line of the steam boiler is ended and instead, condensate is supplied from the condensate separator. Thus, from the moment at which contaminated condensate is supplied, the full separating capacity of the condensate stripper is available. The method of the present disclosure thus avoids the incorporation of a corresponding tank farm for storage of uncleaned process condensate for the start-up process.

In a further aspect, the present disclosure relates to a method of short-term deactivation of an apparatus for steam reforming, preferably an apparatus according to the present disclosure. For this purpose, a condensate stripper is supplied with water from a boiler water feed line of a steam boiler as soon as the supply of condensate from a condensate stripper has ended. The effect of this is that the condensate stripper can continue to be run continuously at the optimal thermal and hydraulic operating point if the steam reforming has to be deactivated briefly. For this purpose, the condensate stripper continues to be supplied continuously with steam from the steam boiler. If the steam reforming is recommenced later, the condensate stripper is already at the optimal thermal and hydraulic operating point, and so, when the apparatus for steam reforming is restarted, the supply of water from the boiler water feed line of the steam boiler can be ended and instead, condensate is supplied from the condensate separator.

It should be understood that the arrows in the drawings indicate the flow direction within the connections.

FIG. 1 firstly shows an apparatus for steam reforming 10 according to the prior art. This has a reactor 10, a condensate separator 30 and a $CO_2$ separator 40. The gas mixture thus produced may be supplied, for example, to an apparatus for the Haber-Bosch process 50. The apparatus for steam reforming 10 also has a water circuit. This comprises a condensate stripper 60 in which organic constituents are removed from the condensate. The cleaned condensate runs from the condensate stripper 60 through a demineralization apparatus 70 and a degassing apparatus 80 into the steam boiler 90. The water is heated and evaporated therein. The steam may be passed into the reactor via an optional first superheater 100. Steam may likewise be conducted from the steam boiler 90 through an optional second superheater 110 into the condensate stripper 60. This steam takes up the volatile organic constituents and is conducted into the reactor 20 for further conversion thereof. In the example shown, the reactor 20 is constructed in three sections. In a first reactor section 21, methane is reacted with steam, air is supplied via an air feed 120 between the first reactor section 21 and the second reactor section 22, such that an oxidative conversion takes place in the second reactor section 22. Steam is added again between the second reactor section 22 and the third reactor section 23, such that a water-gas shift reaction takes place in the third reactor section 23. These processes proceed in stable operation. If, however, the apparatus for steam reforming 10 is first started up, the processes have not yet reached a steady state. More particularly, it is not possible to achieve any removal of the organic impurities from the condensate in the condensate stripper 60. Therefore, the condensate is first conducted into a storage tank 140 and then fed back to the condensate stripper 60 later on in regular operation.

Figure 2:
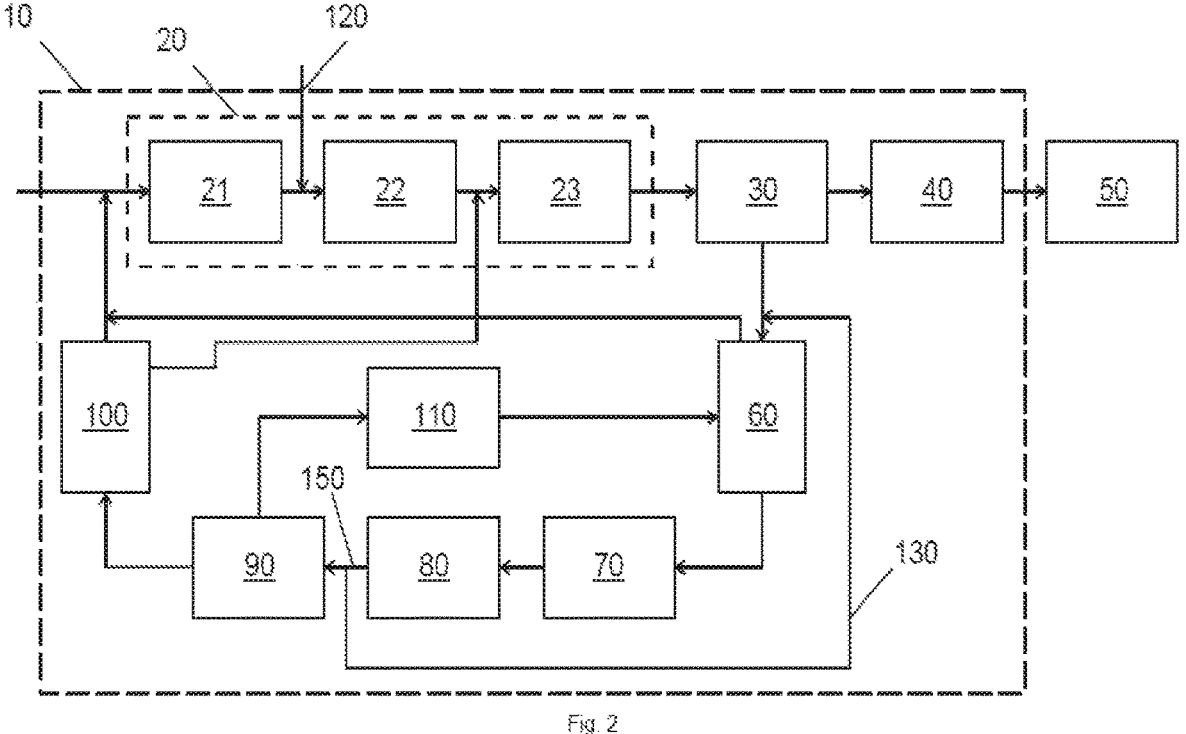
FIG. 2 is a schematic view of an example apparatus of the present disclosure.

By contrast, FIG. 2 shows an apparatus of the present disclosure for steam reforming 10. This differs in that the storage tank 140 can be omitted and replaced by providing an inventive connection 130 between the degassing apparatus 80 and the steam boiler 90 and the condensate stripper 60, in such a way that hot water at about the same temperature (difference ±40 K, preferably ±25 K) can be conducted from the steam boiler 90 into the condensate stripper 60 at the same place as the condensate from the condensate separator 30. The condensate stripper is thus started up early with hot water from the boiler water feed line 150 of the steam boiler 90 and steam and brought into the thermally steady state before the condensate is obtained in the condensate separator 30. By this, any intermediate storage is avoided.

REFERENCE NUMERALS

10 apparatus for steam reforming

20 reactor

21 first reactor section

22 second reactor section

23 third reactor section

30 condensate separator

40 $CO_2$ separator

50 apparatus for the Haber-Bosch process

60 condensate stripper

70 demineralization apparatus

80 degassing apparatus

90 steam boiler

100 first superheater

110 second superheater

120 air feed

130 connection according to present disclosure

140 storage tank

150 boiler water feed line

What is claimed is:

1. An apparatus for steam reforming, comprising:
   a reactor that is configured to produce hydrogen;
   a condensate separator, wherein the reactor is connected to the condensate separator in such a way to conduct a gas mixture that is produced from the reactor into the condensate separator;
   a condensate stripper, wherein the condensate separator and the condensate stripper are connected to each other in such a way to conduct condensate that is separated out in the condensate separator into the condensate stripper; and
   a steam boiler, wherein the condensate separator and the steam boiler are connected to each other in such a way to conduct cleaned condensate from the condensate stripper into the steam boiler, wherein the steam boiler is connected to the reactor by a first connection configured to conduct steam, wherein the steam boiler is connected to the condensate stripper by a second connection configured to conduct steam,
   wherein a boiler water feed line of the steam boiler is connectable to the condensate stripper in a liquid-conducting manner, and wherein a supply from the boiler water feed line is at a same location of the condensate stripper as a supply of the condensate from the condensate separator.

2. The apparatus of claim 1, wherein a condensate-conducting connection between the condensate separator and the condensate stripper and a liquid-conducting connection between the boiler water feed line and the condensate stripper lead into the condensate stripper via a common connection.

3. The apparatus of claim 1, wherein the boiler water feed line is connectable to the condensate stripper in a liquid-conducting manner via a valve.

4. A method of starting up an apparatus for steam reforming, comprising:
   producing a gas mixture including hydrogen in a reactor;
   conducting the gas mixture produced in the reactor to a condensate separator;
   supplying a condensate stripper first with water from a boiler water feed line of a steam boiler;
   then supplying the condensate stripper and the reactor with steam from the steam boiler; and
   after establishment of thermal equilibrium, ending the feed of water from the boiler water feed line and, instead, supplying condensate from the condensate separator to the condensate stripper and conducting cleaned condensate from the condensate stripper into the steam boiler;
   wherein the boiler water feed line of the steam boiler is connectable to the condensate stripper in a liquid-conducting manner;
   wherein a supply from the boiler water feed line is at a same location of the condensate stripper as a supply of the condensate from the condensate separator.

5. A method of short-term deactivation of an apparatus for steam reforming, comprising:
   producing a gas mixture including hydrogen in a reactor;
   conducting the gas mixture produced in the reactor to a condensate separator;
   supplying a condensate stripper with water from a boiler water feed line of a steam boiler as soon as a feed of condensate from a condensate separator has ended, wherein the condensate stripper and the reactor are continuously supplied with steam from the steam boiler; and
   upon starting up of the apparatus for steam reforming, ending the supply of water from the boiler water feed line and, instead, supplying condensate from the condensate separator to the condensate stripper and con-
ducting cleaned condensate from the condensate strip-
per into the steam boiler;

wherein the boiler water feed line of the steam boiler is
connectable to the condensate stripper in a liquid-
conducting manner;

wherein a supply from the boiler water feed line is at a
same location of the condensate stripper as a supply of
the condensate from the condensate separator.

6. The apparatus of claim 1 wherein the first connection
configured to conduct steam includes a first superheater.

7. The apparatus of claim 6 wherein the second connec-
tion configured to conduct steam includes a second super-
heater.

8. The apparatus of claim 6 wherein the first superheater
includes a heat exchanger.

9. The apparatus of claim 1 wherein the second connec-
tion configured to conduct steam includes a superheater.

10. The apparatus of claim 9 wherein the superheater
includes a heat exchanger.

* * * * *